July 20, 1965 D. H. SCHAEFER 3,196,261

FULL BINARY ADDER

Filed Jan. 9, 1963

INVENTOR.
DAVID H. SCHAEFER
BY
[signature]
W. H. King
ATTORNEYS 3,196,261
FULL BINARY ADDER David H. Schaefer, Oxon Hill, Md., assignor to the United States of America as represented by the Administrator of the National Aeronautics and Space Administration Filed Jan. 9, 1963, Ser. No. 250,451
8 Claims. (Cl. 235—176)
(Granted under Title 35, U.S. Code (1952), sec. 266)

The invention described herein may be manufactured and used by or for the Government of the United States of America for governmental purposes without the payment of royalties theron or therefor.

The invention relates generally to an adder and more particularly to an improved full binary adder such as used in computing or data processing equipment.

When it is desired to add two binary numbers (augend number and addend number) a full binary adder is needed for each binary place. A full binary adder is a device which will add three binary digits (bits) and produce a sum output (S) and a carry output ($C_0$). The three binary input bits received by an adder for a particular binary place are the augend bit (A) and the addend bit (B) for this binary place, and the carry bit (C) produced as the carry output ($C_0$) by the adder for the next less significant binary place. A full binary adder must satisfy the following truth table.

| A | B | C | S | $C_0$ |
|---|---|---|---|---|
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 0 | 0 | 1 | 1 | 0 |
| 1 | 0 | 1 | 0 | 1 |
| 0 | 1 | 1 | 0 | 1 |
| 1 | 1 | 1 | 1 | 1 |

This truth table shows in its first three columns the eight possible combinations of inputs A, B, and C. The fourth column shows the S output for each of these eight combinations, and the fifth column shows the $C_0$ output for each of these eight combinations.

As will be evident from the following discussion, the above truth table complies with the rules for the addition of three binary digits. If three binary digits are added, there are eight possible combinations of the three digits. These eight combinations together with the sum digit and the carry digit for each combination follows: 0+0+0=0 with a carry of 0; 1+0+0=0+1+0=0+0+1=1 with a carry of 0; 1+1+0=1+0+1=0+1+1=0 with a carry of 1; and 1+1+1=1 with a carry of 1. The first combination is shown by the first row of the truth table; the next three combinations are shown by the second, third, and fifth rows of the truth table; the next three combinations are shown by the fourth, sixth, and seventh rows of the truth table; and the last combination is shown by the last row of the truth table.

The "0's" or "1's" that are either applied to or produced by a full binary adder can be represented by anything that has two mutually exclusive conditions. For example, they can be represented by the presences and the absences of pulses; by two different voltage levels; by switches that are either opened or closed; etc.

Many prior art full binary adders have certain disadvantages in that they usually have complex circuitry utilizing many components; they sometime require that the complements of the inputs be obtained which make the circuitry even more complex; and oftentimes they are not stable over temperature and voltage fluctuations.

The general purpose of the present invention is to provide an improved full binary adder which embraces all the advantages of similarly employed full binary adders; which utilizes less complex circuitry than most prior full binary adders; which does not require that the complements of the inputs be obtained; and which is stable over temperature and voltage fluctuations.

The preferred embodiment circuitry disclosed as incorporating the invention utilizes the presences and absences of pulses to represent "0's" and "1's." This circuitry consists of only four diodes, six transistors, and nine resistors.

The novel features of the invention as well as the invention itself, both as to its organization and method of operation, will best be understood from the following description, when read in connection with the accompanying drawings, in which.

Figure 1:
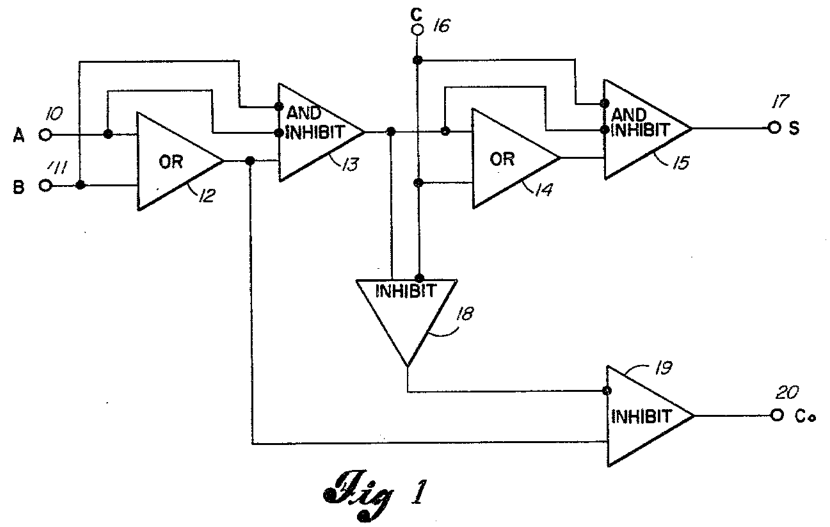
FIG. 1 is a block diagram of the invention.

Referring now to FIG. 1 there is shown an "or" gate 12 having input terminals 10 and 11. Input signals A and B, which are in the form of the presence or the absence of pulses, are applied to input terminals 10 and 11. The presence of a pulse represents a "1" and the absence of a pulse represents a "0." As is well known in the art, a pulse will be present at the output of "or" gate 12 if at any instant there is a pulse present at either input terminal 10 or 11, or if pulses are present at both input terminals 10 and 11. The output of "or" gate 12 is applied to the non-dotted input of an "and inhibit" gate 13; and inputs A and B are applied to the two dotted inputs of "and inhibit" gate 13. An "and inhibit" gate is a binary device having one non-dotted input, two dotted inputs, and an output. It will produce a pulse at its output if a pulse is present at its non-dotted input and if pulses are not present at both of its dotted inputs. Therefore, a pulse will be present at the output of gate 13 if there is a pulse present at its non-dotted input and if pulses are not present at both of its dotted inputs.

Now consider the combined functions of gates 12 and 13. A pulse will be present at the output of gate 13 whenever there is a pulse present at either input terminal 10 or 11 if pulses are not simultaneously present at both of these terminals. This combined function of gates 12 and 13 is called an "exclusive or" function and the combined structure of gates 12 and 13 is called an "exclusive or" gate.

Gate 14 is an "or" gate identical to gate 12 and gate 15 is an "and inhibit" gate identical to gate 13. Gates 14 and 15 are also connected to form an "exclusive or" gate in the same way that gates 12 and 13 are connected to form an "exclusive or" gate. The two inputs applied to gate 14 are the output of gate 13 and the carry input C which is applied to an input terminal 16. There will be produced, at an output terminal 17, a sum output S which will follow the truth table for binary addition referred to earlier in this specification. If the eight combinations of input signals A, B and C, shown by the first three columns of the truth table, are applied to input terminals 10, 11, and 16 respectively, then there will be produced, at output terminal 17, outputs which will correspond to the fourth column S of the truth table.

The C input at terminal 16, in addition to being applied to gates 14 and 15, is applied to the dotted or inverted input of an "inhibit" gate 18. The output of gate 13, in addition to being applied to gate 14, is applied to the non-dotted or non-inverted input of gate 18. As is well known in the prior art, there will be a pulse present at the output of "inhibit" gate 18 if there is a pulse present at its non-dotted input and if there is no pulse present at its dotted input. An "inhibit" gate can be thought of as an "and" gate with one of its inputs inverted before being applied to it.

The output of gate 18 is applied to the dotted or inverted input of an "inhibit" gate 19. The output of gate 12, in addition to being applied to gate 13, is applied to the non-dotted or non-inverted input of gate 19. There will be a pulse present at the output terminal 20 of gate 19 if there is a pulse present at its non-dotted input and if there is no pulse present at its dotted input. The output produced at terminal 20 is the carry output $C_0$ shown by the truth table for binary addition referred to earlier in this specification. If the eight combinations of input signals A, B and C, shown by the first three columns of the truth table, are applied to input terminals 10, 11, and 16, respectively, then there will be produced, at output terminal 20, output signals which will correspond to the fifth column $C_0$ of the truth table.

A complete operation of a full binary adder defined by the block diagram in FIG. 1 will now be described. This description will be made on the assumption that a pulse is present at input A, no pulse is present at input B, and a pulse is present at input C. This combination of inputs is one of eight possible combinations of inputs and it corresponds to the sixth row from the top of the truth table referred to earlier. For this assumed combination of inputs, a pulse will be present at the output of gate 12; a pulse will be present at the output of gate 13; a pulse will be present at the output of gate 14; no pulse will be present at output terminal 17 since pulses will be present at both the output of gate 13 and the input terminal 16; no pulse will be present at the output of gate 18 since there is a pulse present at input terminal 16; and a pulse will be present at output terminal 20. It should be noted that no output at terminal 17 and an output at terminal 20 satisfies the truth table for the assumed combination of inputs.

Figure 2:
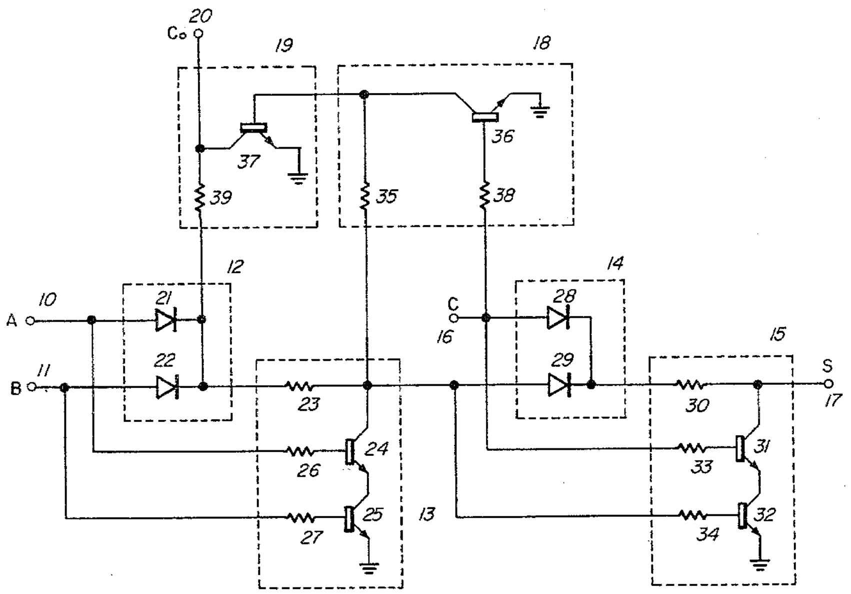
FIG. 2 is a schematic diagram of the preferred embodiment circuitry which incorporates the invention.

Referring now to FIG. 2, there is shown a schematic diagram of the circuitry represented by the blocks in the block diagram of FIG. 1. The dotted rectangles in FIG. 2 encloses the circuitry represented by the corresponding blocks in FIG. 1. Input terminal 10 is connected to the anode of diode 21, and input terminal 11 is connected to the anode of a diode 22. The cathodes of diodes 21 and 22 are connected together to form "or" gate 12.

The cathodes of diodes 21 and 22 are connected through a resistor 23 to the collector of an NPN transistor 24. The emitter of transistor 24 is connected to the collector of an NPN transistor 25. The emitter of transistor 25 is connected to ground. Input terminal 10 is connected through a resistor 26 to the base of transistor 24; and input terminal 11 is connected through a resistor 27 to the base of transistor 25. This circuitry forms "and inhibit" gate 13. A pulse will be present at the collector of transistor 24 whenever there is a pulse at the cathodes of diodes 21 and 22 if pulses are not simultaneously present at both input terminals 10 and 11. If pulses are present at both input terminals 10 and 11, transistors 24 and 25 will conduct and the collector of transistor 24 will be connected to ground.

Input terminal 16 is connected to the anode of a diode 28; and the collector of transistor 24 is connected to the anode of a diode 29. The cathodes of diodes 28 and 29 are connected together to form "or" gate 14.

The cathodes of diodes 28 and 29 are also connected through a resistor 30 to the collector of an NPN transistor 31. The emitter of transistor 31 is connected to the collector of an NPN transistor 32. The emitter of transistor 32 is connected to ground. Input terminal 16 is connected through a resistor 33 to the base of transistor 31; and the collector of transistor 24 is connected through a resistor 34 to the base of transistor 32. Output terminal 17 is connected to the collector of transistor 31. This circuitry forms "and inhibit" gate 15. A pulse will be present at output terminal 17 whenever there is a pulse at the cathodes of diodes 28 and 29 if pulses are not simultaneously present at both the input terminal 16 and the collector of transistor 24. If pulses are present at both the input terminal 16 and the collector of transistor 24, transistors 31 and 32 will conduct and output terminal 17 will be connected to ground.

The collector of transistor 24 is connected through a resistor 35 to the collector of an NPN transistor 36 and to the base of an NPN transistor 37. The emitters of transistors 36 and 37 are connected to ground. Input terminal 16 is connected through a resistor 38 to the base of transistor 36. The cathodes of diodes 21 and 22 are connected through a resistor 39 to the collector of transistor 37 and to output terminal 20. Resistors 35 and 38, and transistor 36 form "inhibit" gate 18. A pulse will be present at the collector of transistor 36 if there is a pulse present at the collector of transistor 24 and if there is no pulse present at input terminal 16. If there is a pulse present at input terminal 16, transistor 36 will conduct and connect the collector of transistor 36 to ground.

Resistor 39 and transistor 37 form "inhibit" gate 19. A pulse will be present at output terminal 20 if there is a pulse present at the cathodes of diodes 21 and 22, and if there is no pulse present at the collector of transistor 36. If there is a pulse present at the collector of transistor 36, transistor 37 will conduct and connect output terminal 20 to ground.

Obviously numerous modifications or variations of the present invention are possible in light of the above teachings. For example, different circuitry than that disclosed in FIG. 2 may be used for the "or" gates, the "inhibit" gates, or the "and inhibit" gates. It is therefore to be understood that within the scope of the appended claims the invention may be practiced otherwise than as specifically described herein.

What is claimed is:

1. A full binary adder comprising: first and second "exclusive or" gates with each having first and second input terminals and an output terminal and with at least the first "exclusive or" gate including an "or" gate; means for connecting two binary input signals to the two input terminals of the first "exclusive or" gate and to said "or" gate; means for connecting a third binary input signal and the output signal from the output terminal of the first "exclusive or" gate to the two input terminals of the second "exclusive or" gate; first and second "inhibit" gates with each having one inverted and one non-inverted input terminal and with each having an output terminal; means for connecting said third input signal to the inverted input terminal of the first "inhibit" gate; means for connecting the output signal from the first "exclusive or" gate to the non-inverted input terminal of the first "inhibit" gate; means for connecting the output signal from the first "inhibit" gate to the inverted input terminal of the second "inhibit" gate; and means for connecting the output signal from the "or" gate to the non-inverted input terminal of the second "inhibit" gate whereby the output signal at the output terminal of the second "exclusive or" gate is the sum output signal and the output signal at the output terminal of the second "inhibit" gate is the carry output signal.

2. A full binary adder as claimed in claim 1 wherein said first "exclusive or" gates consists of: a first resistor having first and second terminals; a first diode connected between the first input terminal and the first terminal of the first resistor; a second diode connected between the second input terminal and the first terminal of the first resistor; a first transistor with its collector connected to the second terminal of the first resistor; a second transistor with its collector connected to the emitter of the first transistor and with its emitter connected to ground; a second resistor connected between one of the input terminals and the base of the first transistor; and a third resistor connected between the second input terminal and the base of the second transistor.

3. A full binary adder as claimed in claim 1 wherein said first "inhibit" gate consists of: a first transistor having its emitter connected to ground; a first resistor connected between the collector of the first transistor and the output terminal of the first "exclusive or" gate; and a second resistor connected between the base of the first transistor and the third input whereby the output of the first "inhibit" gate is produced at the collector of the first transistor.

4. A full binary adder as claimed in claim 3 wherein said second "inhibit" gate consists of: a second transistor with its emitter connected to ground and with its base connected to the collector of the first transistor; and a third resistor connected between the collector of the second transistor and the output of said "or" gate whereby the carry output is produced at the collector of the second transistor.

5. A full binary adder as claimed in claim 1 wherein said first "exclusive or" gate comprises: an "or" gate with its inputs connected to the two input terminals of the "exclusive or" gate; and an "and inhibit" gate with its two dotted inputs connected to the two input terminals and with its non-dotted input connected to the output of the "or" gate.

6. A full binary adder as claimed in claim 5 wherein said "and inhibit" gate comprises: a first resistor connected between the output of the "or" gate and the collector of a first transistor; a second transistor with its emitter connected to ground and with its collector connected to the emitter of the first transistor; a second resistor connected between one of the two input terminals and the base of the first transistor; and a third resistor connected between the other of the two input terminals and the base of the second transistor.

7. In a full binary adder, means for producing a "carry output" from the three inputs applied to the full binary adder comprising: means for producing the "or" and the "exclusive or" functions from two of the three inputs; a first "inhibit" gate having an inverted input and a non-inverted input connected to receive the third input at its inverted input and the produced "exclusive or" function at its non-inverted input; and a second "inhibit" gate having an inverted input and a non-inverted input connected to receive at its inverted input the output from the first "inhibit" gate and connected to receive at its non-inverted input the produced "or" function whereby the output of the second "inhibit" gate is the carry output.

8. A full binary adder having three inputs comprising: means for producing "or" and first "exclusive or" functions from two of the three inputs; a first "inhibit" gate having an inverted input and a non-inverted input connected to receive the third input at its inverted input and the produced "exclusive or" function at its non-inverted input; a second "inhibit" gate having an inverted input and a non-inverted input connected to receive at its inverted input the output from the first "inhibit" gate and connected to receive at its non-inverted input the produced "or" function; and a means for producing a second "exclusive or" function from the third input and the first "exclusive or" function whereby the second "exclusive or" function is the sum output and the output of the second "inhibit" gate is the carry output.

No references cited.

MALCOLM A. MORRISON, *Primary Examiner.*